US006563432B1

(12) United States Patent
Millgård

(10) Patent No.: US 6,563,432 B1
(45) Date of Patent: May 13, 2003

(54) AIRCRAFT DOCKING SYSTEM AND METHOD WITH AUTOMATIC CHECKING OF APRON AND DETECTION OF FOG OR SNOW

(75) Inventor: Lars Millgård, Ostersund (SE)

(73) Assignee: Safegate International AB, Malmo (CH)

( * ) Notice: Subject to any disclaimer, the term of this patent is extended or adjusted under 35 U.S.C. 154(b) by 155 days.

(21) Appl. No.: 09/758,416

(22) Filed: Jan. 12, 2001

(51) Int. Cl.$^7$ ................................................ G08G 5/04
(52) U.S. Cl. ...................... 340/961; 340/968; 340/958; 340/903; 340/942; 340/602; 340/601; 244/114 R
(58) Field of Search ................................ 340/961, 968, 340/958, 903, 942, 602, 601; 244/114 R

(56) References Cited

U.S. PATENT DOCUMENTS

| | | | |
|---|---|---|---|
| 4,249,159 A | 2/1981 | Stasko | 340/26 |
| 4,319,332 A | 3/1982 | Mehnert | 364/516 |
| 4,995,102 A | 2/1991 | Ichinose et al. | 342/158 |
| 5,118,180 A | 6/1992 | Wichmann et al. | 356/5 |
| 5,166,746 A * | 11/1992 | Sato et al. | 356/152 |
| 5,323,472 A * | 6/1994 | Falk | 382/31 |
| 5,375,058 A | 12/1994 | Bass | 364/439 |
| 5,424,746 A | 6/1995 | Schwab et al. | 342/49 |
| 5,475,370 A | 12/1995 | Stern | 340/583 |
| 5,589,822 A | 12/1996 | Stern | 340/583 |
| 5,627,511 A | 5/1997 | Takagi et al. | 340/435 |
| 5,675,661 A | 10/1997 | Richman et al. | 382/104 |
| 6,023,665 A | 2/2000 | Millgård | 702/151 |
| 6,100,964 A | 8/2000 | De Cremiers | 356/4.01 |
| 6,389,334 B1 * | 5/2002 | Castor | 701/3 |

FOREIGN PATENT DOCUMENTS

| | | |
|---|---|---|
| DE | 4009668 | 10/1991 |
| DE | 4301637 | 8/1994 |
| EP | 0035101 | 9/1981 |
| EP | 188757 | 7/1986 |
| EP | 0880122 | 11/1998 |
| JP | 62-15480 A | 1/1987 |
| WO | WO 9313104 | 7/1993 |
| WO | WO 9315416 | 8/1993 |
| WO | 96/20465 A | 7/1996 |

OTHER PUBLICATIONS

Database WPI, Section EI. Week 9332, Derwent Publications, Ltd., London GB, AN 93–256658, Aug. 7, 1992 (Abstract).

Database WPI, Section EI. Week 9514, Derwent Publications, Ltd., London GB, AN 95–105467, Dec. 13, 1994 (Abstract).

* cited by examiner

*Primary Examiner*—Daniel J. Wu
*Assistant Examiner*—Tai T. Nguyen
(74) *Attorney, Agent, or Firm*—Blank Rome, LLP

(57) ABSTRACT

A system for detecting, identifying and docking aircraft using laser pulses to obtain a profile of an object in the distance initially scans the area in front of the gate until it locates and identifies an object. Once the identity of the object is known, the system tracks the object. The system also monitors an area of the apron near the object to detect obstacles such as ground service vehicles. The system also analyzes the laser pulses to determine whether they are reflected from a solid object or from fog or other condensation or precipitation to avoid misidentifying condensation or precipitation as a solid object.

29 Claims, 10 Drawing Sheets

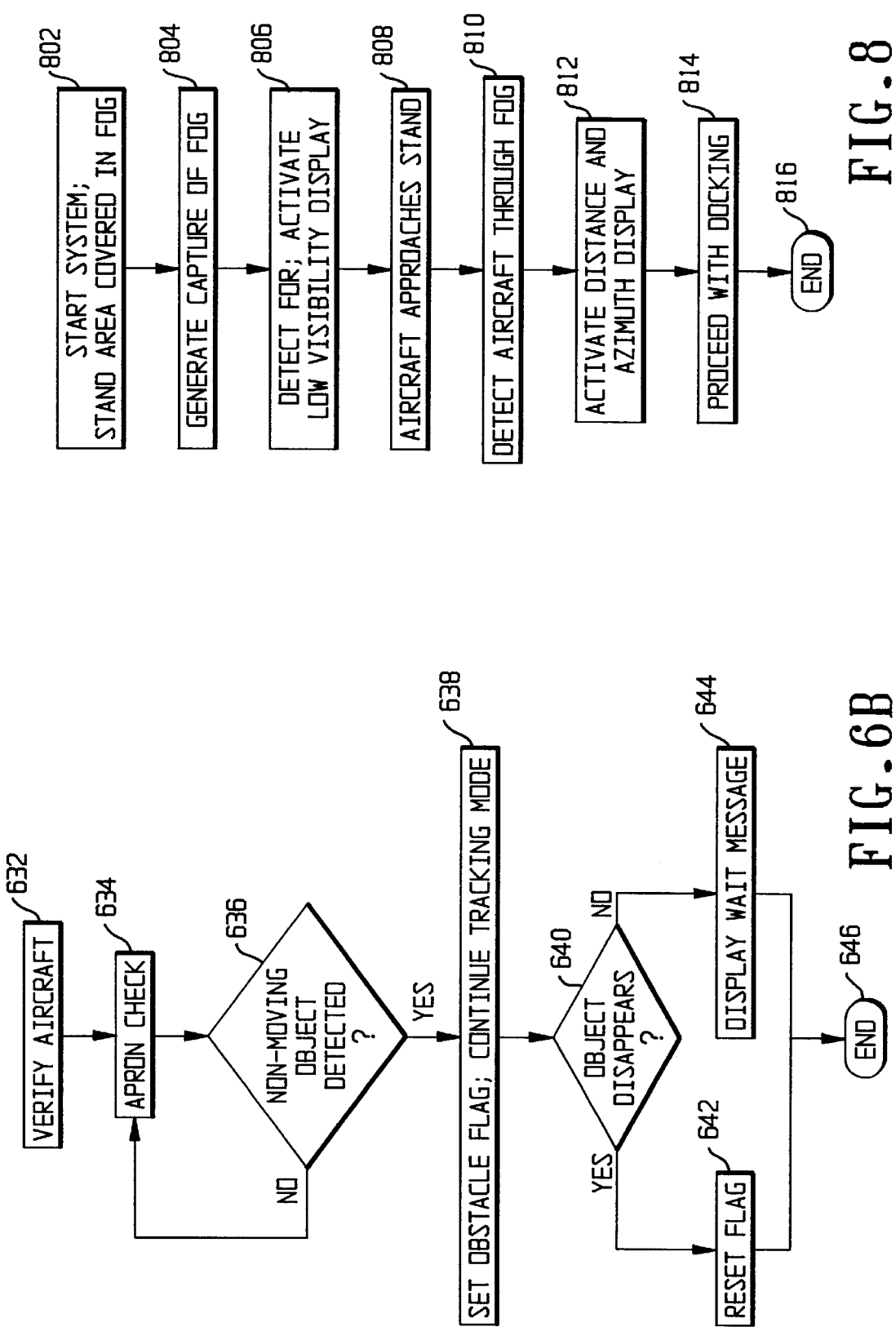

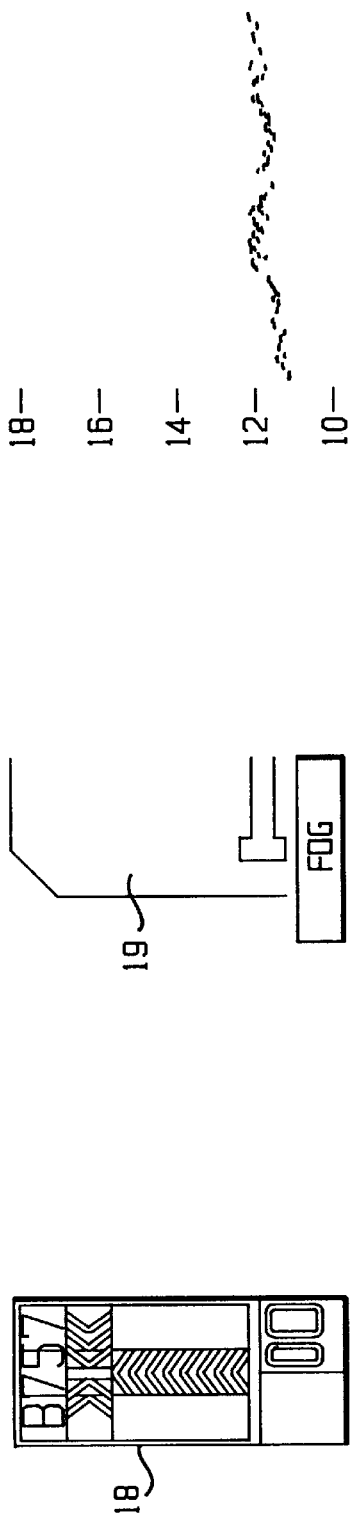
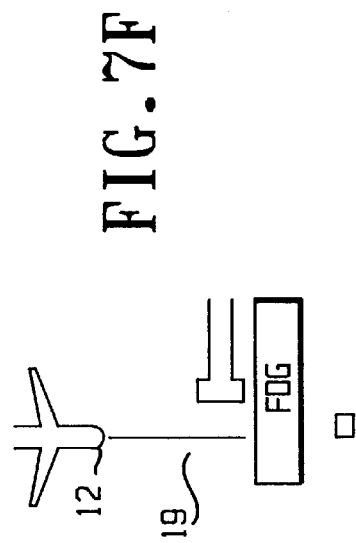
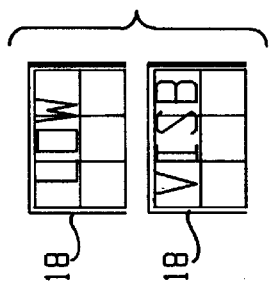
FIG. 7A  FIG. 7B  FIG. 7C  FIG. 7D  FIG. 7E  FIG. 7F

AIRCRAFT DOCKING SYSTEM AND METHOD WITH AUTOMATIC CHECKING OF APRON AND DETECTION OF FOG OR SNOW

FIELD OF THE INVENTION

The present invention is directed to aircraft docking systems and more particularly to safety enhancements for aircraft docking systems for automatic checking of the apron for obstacles before and during docking and for detection of fog and snowfall in front of the docking system. The present invention is further directed to methods implemented on such systems.

DESCRIPTION OF RELATED ART

In recent years, there has been a significantly increased number of passenger, cargo and other aircraft traffic, including takeoffs, landings and other aircraft ground traffic. Also, there has been a marked increase in the number of ground support vehicles which are required to offload cargo and to provide catering services and ongoing maintenance and support of all aircraft. With that substantial increase in ground traffic has come a need for greater control and safety in the docking and identification of aircraft on an airfield.

To that end, U.S. Pat. No. 6,023,665, issued Feb. 8, 2000, to the same inventor named in the present application and hereby incorporated by reference into the present disclosure, teaches a system for detecting, identifying and docking aircraft using laser pulses to obtain a profile of an object in the distance. The system initially scans the area in front of the gate until it locates and identifies an object. Once the object is identified as an airplane, the system tracks the airplane. By using the information from the profile, the system can in real time display the type of airplane, the distance from the stopping point and the lateral position of the airplane. The modes of operation of the system include a capture mode, in which an object is detected and determined to be an aircraft, and a tracking mode, in which the type of aircraft is verified and the motion of the aircraft toward the gate is monitored.

Referring to FIG. 1A, the docking guidance system of the above-referenced patent, generally designated 10, provides for the computerized location of an object, verification of the identity of the object and tracking of the object, the object preferably being an aircraft. In operation, once the control tower 14 lands an aircraft 12, it informs the system that the aircraft is approaching a gate 16 and the type of aircraft (i.e., 747, L-1011, etc.) expected. The system 10 then scans the area 19 in front of the gate 16 until it locates an object that it identifies as an airplane 12. The system 10 then compares the measured profile of the aircraft 12 with a reference profile for the expected type of aircraft and evaluates other geometric criteria characteristic of the expected aircraft type. If the located aircraft, at a minimum specified distance (e.g., 12 m) before the stop position, does not match the expected profile and the other criteria, the system informs or signals the tower 14, displays a stop sign and shuts down.

If the object is the expected aircraft 12, the system 10 tracks it into the gate 16 by displaying in real time to the pilot the distance remaining to the proper stopping point and the lateral position of the plane 12. The lateral position of the plane 12 is provided on a display 18 allowing the pilot to correct the position of the plane to approach the gate 16 from the correct angle. Once the airplane 12 is at its stopping point, that fact is shown on the display 18 and the pilot stops the plane.

Referring to FIG. 1B, the system 10 includes a Laser Range Finder (LRF) 20, two mirrors 21, 22, a display unit 18, two step motors 24, 25, and a microprocessor 26. Suitable LRF products are sold by Laser Atlanta Corporation and are capable of emitting laser pulses, receiving the reflections of those pulses reflected off of distant objects and computing the distance to those objects.

The system 10 is arranged such that there is a connection 28 between the serial port of the LRF 20 and the microprocessor 26. Through that connection, the LRF 20 sends measurement data approximately every $\frac{1}{400}$th of a second to the microprocessor 26. The hardware components generally designated 23 of the system 20 are controlled by the programmed microprocessor 26. In addition, the microprocessor 26 feeds data to the display 18. As the interface to the pilot, the display unit 18 is placed above the gate 16 to show the pilot how far the plane is from its stopping point 29, the type of aircraft 30 the system believes is approaching and the lateral location of the plane. Using that display, the pilot can adjust the approach of the plane 12 to the gate 16 to ensure the plane is on the correct angle to reach the gate. If the display 18 shows the wrong aircraft type 30, the pilot can abort the approach before any damage is done. That double check ensures the safety of the passengers, plane and airport facilities because if the system tries to dock a larger 747 at a gate where a 737 is expected, it likely will cause extensive damage.

In addition to the display 18, the microprocessor 26 processes the data from the LRF 20 and controls the direction of the laser 20 through its connection 32 to the step motors 24, 25. The step motors 24, 25 are connected to the mirrors 21, 22 and move them in response to instructions from the microprocessor 26. Thus, by controlling the step motors 24, 25, the microprocessor 26 can change the angle of the mirrors 21, 22 and aim the laser pulses from the LRF 20.

The mirrors 21, 22 aim the laser by reflecting the laser pulses outward over the tarmac of the airport. In the preferred embodiment, the LRF 20 does not move. The scanning by the laser is done with mirrors. One mirror 22 controls the horizontal angle of the laser, while the other mirror 21 controls the vertical angle. By activating the step motors 24, 25, the microprocessor 26 controls the angle of the mirrors and thus the direction of the laser pulse.

The system 10 controls the horizontal mirror 22 to achieve a continuous horizontal scanning within a ±10 degree angle in approximately 0.1 degree angular steps which are equivalent to 16 microsteps per step with the Escap EDM-453 step motor. One angular step is taken for each reply from the reading unit, i.e., approximately every 2.5 ms. The vertical mirror 21 can be controlled to achieve a vertical scan between +20 and −30 degrees in approximately 0.1 degree angular steps with one step every 2.5 ms. The vertical mirror is used to scan vertically when the nose height is being determined and when the aircraft 12 is being identified. During the tracking mode, the vertical mirror 21 is continuously adjusted to keep the horizontal scan tracking the nose tip of the aircraft.

While the system disclosed in the above-cited patent detects the airplane, that system does not detect ground support vehicles or other objects in the apron of the docking area. Because of the pilot's limited field of view, the aircraft may collide with such ground support vehicles or other objects. Also, the system may give erroneous warnings in fog or snow, particularly the former.

Fog is most often seen between 10–25 m by the system. As that distance is closer, or in the area of, the stop position, the system will generate a gate blocked or ID-fail condition if the capture procedure triggers on the fog. The capture procedure needs a method to recognize that the object captured is most likely fog and is no obstruction to the docking procedure once the aircraft appears.

Log files taken during foggy conditions show that fog is reported like a solid object in front of the system. A sweep into fog often reports close to 100% echoes, and the echoes vary in distance only with a few decimeters of each other. Snowfall is most often more spread out, giving 60–80% echoes with a spread of 5–10 m. Thus, snow is generally easier to detect, i.e., discriminate from a solid object, than fog is. FIGS. 2A and 2B show sample images of fog, while FIGS. 2C and 2D show sample images of snow.

SUMMARY OF THE INVENTION

It will be apparent from the above that a need exists in the art for an aircraft detection system which overcomes the above-noted problems of the prior art. It is therefore an object of the present invention to permit detection of objects in the apron.

It is another object to support the pilot's judgment as to whether it is safe to proceed to the gate or there is a risk of collision.

It is another object of the present invention to permit accurate detection of fog and snow.

To achieve the above and other objects, the present invention is directed to a system and method for aircraft detection in which the apron is automatically checked for obstacles before and during docking. As the aircraft may be approaching the gate at a high speed, it is essential that checking for obstacles occupy the system for the minimum amount of time so that the influence on the docking function is minimized. It is assumed to be particularly important that the area is checked which is swept by the wings of a narrow-body aircraft or swept by the engines of a wide-body aircraft. It is also assumed that it is not so important to check the apron at the bridge side of the center line as it is to check the opposed side, as most movements of service vehicles take place on the opposed side. Therefore, it is assumed that the scanner unit can be mounted such that the optical axis points to the left of the center line, e.g., 5°, thus taking maximum advantage of the horizontal scanning range of the system.

The present invention is further directed to a system and method for aircraft detection in which fog and snowfall are detected by analyzing the laser sweep triggering the capture condition. If the measured distance to the caught object is found to vary randomly (in a non-deterministic way) across the width of the object, the object is considered to be a possible fog/snow condition. A possible fog condition is not considered by the system as a valid target for the tracking phase, so that the system remains in capture mode. If the fog condition prevails, the system informs the pilot/stand operator by displaying a warning message. Under those conditions, it is intended that the pilot shall continue, with caution, to approach the stand area, as the system will be able to pick up the aircraft as soon as it is seen through the fog.

When a fog condition has been detected, the display switches from the standard capture display to a display showing the aircraft type alternating with a message such as "DOWNGRADED" or "LOW VISB" to indicate that the system has downgraded performance due to reduced visibility. A corresponding message is displayed in the operator panel.

Any embodiment, or combination of embodiments, of the present invention can be implemented in the system of the above-referenced patent by appropriate modification.

BRIEF DESCRIPTION OF THE DRAWINGS

Preferred embodiments of the present invention will be set forth in detail with reference to the drawings, in which:

FIGS. 6A and 6B are diagrams of flow charts of the apron scan carried out during capture and tracking modes, respectively;

FIGS. 7A–7I are drawings showing stages in the fog detection procedure;

FIG. 8 is a diagram of a flow chart of the fog detection procedure; and

DETAILED DESCRIPTION OF THE PREFERRED EMBODIMENTS

Figure 1A:
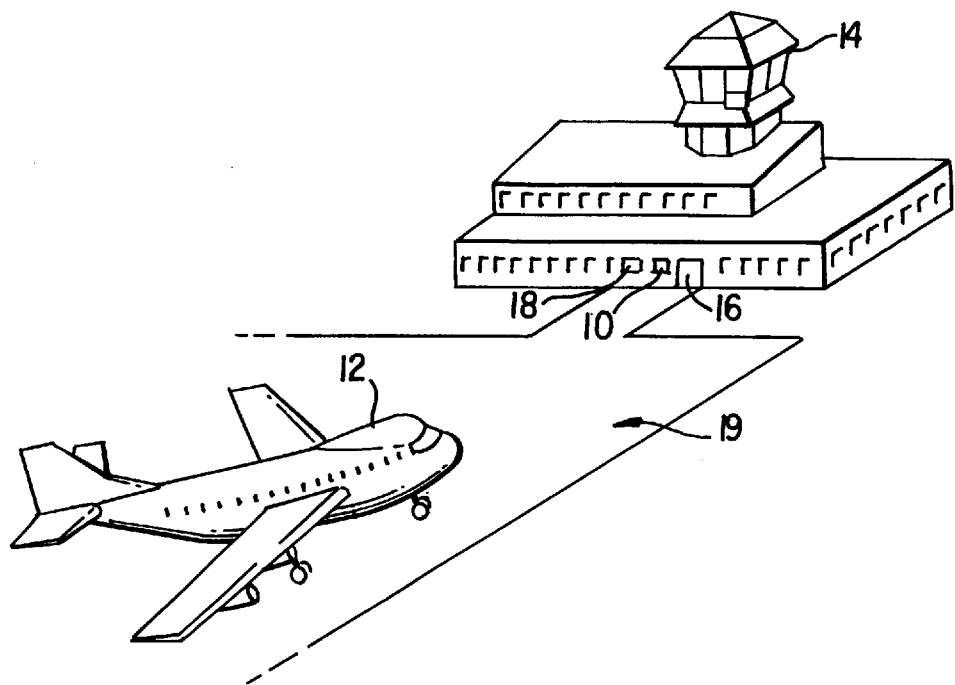
FIGS. 1A and 1B show the aircraft docking system of the above-cited patent, which can be modified accordance with the present invention.
Figure 1B:
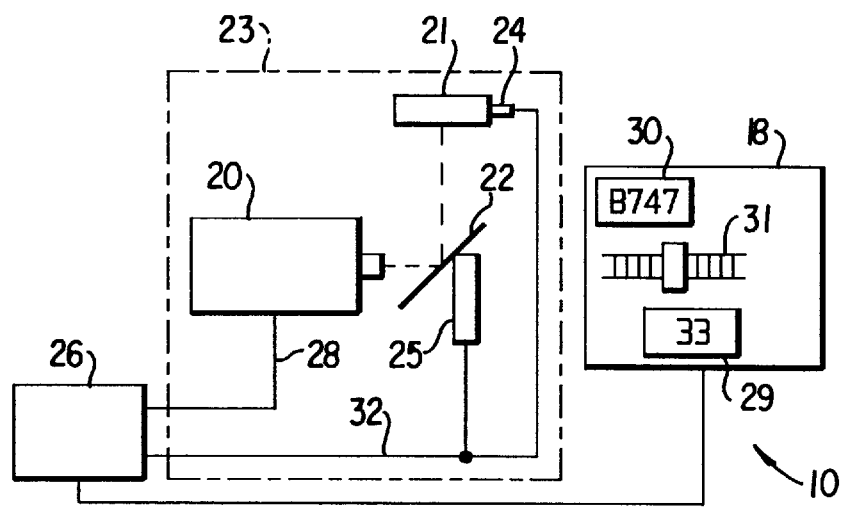
Figure 2A:
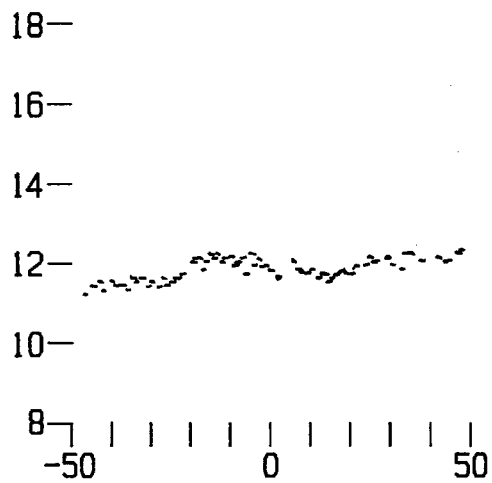
FIGS. 2A and 2B show images of fog taken with the aircraft docking system of FIGS. 1A and 1B.
Figure 2B:
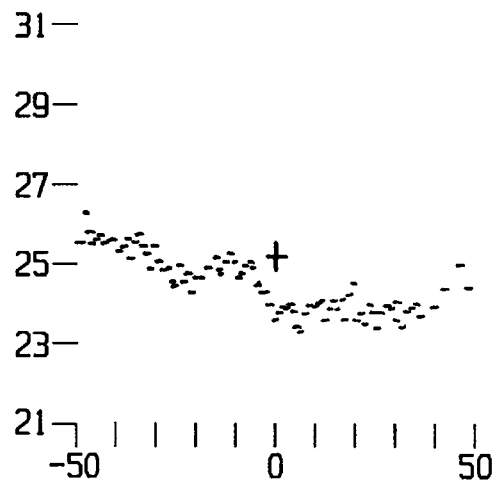
Figure 2C:
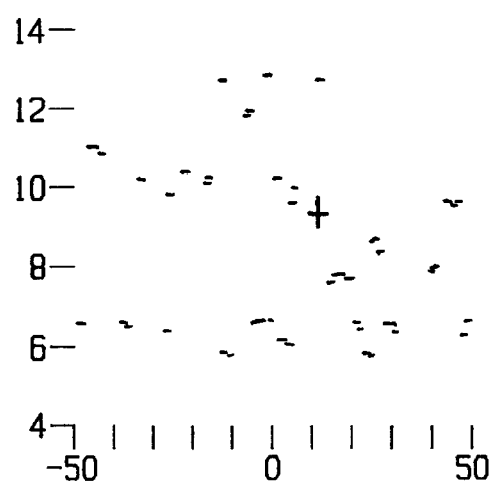
FIGS. 2C and 2D show images of snow taken with the aircraft docking system of FIGS. 1A and 1B.
Figure 2D:
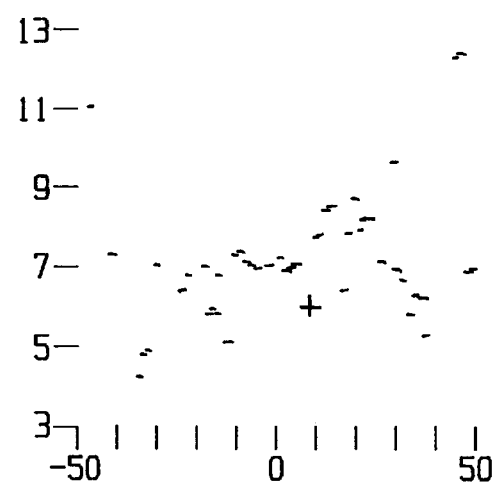

Various preferred embodiments of the present invention will now be set forth in detail with reference to the drawings, in which the same reference numerals refer to the same components or operational steps throughout. First, a preferred embodiment of the apron checking will be disclosed; then, a preferred embodiment of the fog detection will be disclosed. While the two embodiments will be disclosed separately, it will be understood that they can be combined.

The apron-checking embodiment will be disclosed first. Since it is conventional for ground support vehicles to approach an aircraft from the left, the preferred embodiment of the apron checking will be disclosed on that basis. Of course, if it is anticipated that ground support vehicles will approach from the right, the apron checking can be varied accordingly.

Figure 3:
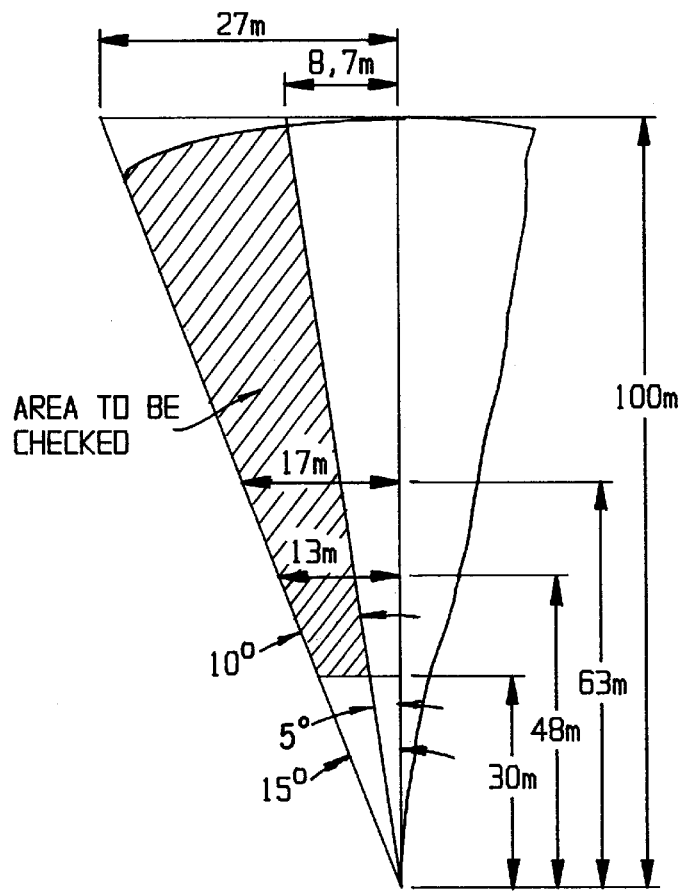
FIG. 3 is a drawing showing an area to be checked during apron check.

FIG. 3 shows the area to be checked. It is assumed that the docking system has a horizontal scanning range of ±10°. As the 5° scan to the right of the center line covers only an area for which the pilot needs no support, the apron check is made only to the left of the center line. The 10° angle of the apron scan will cover the area in front of the right wing tip to an inner limit of about 60 m for aircraft of the same size as a B737. It will also cover the area swept by the inner engine of a wide-body aircraft into about 48 m. That corresponds to a nose position of about 45 m for a B737 and a nose position of about 25 m for B747. It is assumed that the smallest object to be detected has the following dimensions: a width of 1 m and a height of 1.5 m. The apron check feature ignores any echoes closer than stop position (nose)+5 m, in order to allow ground personnel to be present at the parking position.

Figure 4:
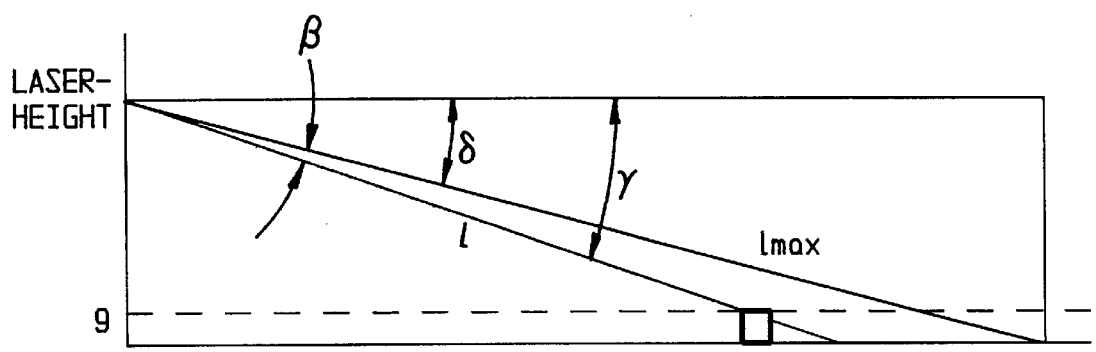
FIG. 4 is a drawing showing the geometry used in ground suppression during apron check.

FIG. 4 shows a scanning geometry used for ground suppression. To reduce problems with ground echoes, e.g. due to heaps of snow, all echoes below a certain level g above ground are ignored. Thus, an echo is ignored if the measured distance l is larger than lg, given by $$lg = (laserheight - g)/\sin \gamma$$

where $\gamma = \delta + \beta$ $\delta = \arcsin (laserheight/lmax)$ $\beta$ = Vertical angle referenced to "reference beam"

lmax = Length of "reference beam" achieved during centerline definition.

laserheight = The value automatically calculated during the center line definition procedure.

In case there are several laserheight values due to ground level variations, the value is used that corresponds to the actual "Covered range" given below.

Figure 5:
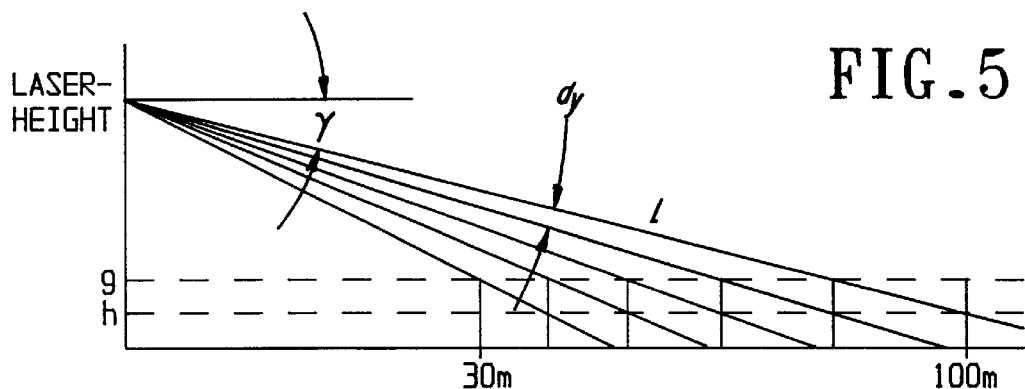
FIG. 5 is a drawing showing the geometry used in calculating vertical scan angles during apron check.

The vertical angle of the scans for the apron check will be explained with reference to FIG. 5. In order to detect an object with a height h the scan thus has to hit the object at a height between g and h.

Several scans are used to cover the area to be checked. The angular step dγ required between the scans is given by the formula $$d\gamma = \tfrac{1}{2} \times [(h-g)/(laserheight-g)] \times \sin 2\gamma$$

As an example, assume that an area from 30 m out to 100 m is to be covered. This gives the following two examples of coverage and scan angles γ in degrees. For both examples, laserheight=5 m. In the first example, h=1.5 m, and g=0.5 m. The resulting values of γ and of the covered range m are given in Table 1:

| γ | Covered range M |
|---|---|
| 7.6 | 34 |
| 6.8 | 38 |
| 6.0 | 43 |
| 5.3 | 48 |
| 4.7 | 54 |
| 4.2 | 61 |
| 3.8 | 68 |
| 3.3 | 77 |
| 3.0 | 87 |
| 2.6 | 98 |

In the second example, h=2 m, and g=1 m. The resulting values of γ and of the covered range m are given in Table 2:

| γ | Covered range m |
|---|---|
| 7.6 | 30–37 |
| 5.7 | 37–47 |
| 4.3 | 47–61 |
| 3.2 | 61–78 |
| 2.4 | 78–102 |

The angular step in the horizontal scan will now be described. Assume that a 1 m wide object is to be detected at 100 m. Assume that 3 hits on the object are required. That means that the resolution must be $< \arctan(0.3/100) \approx 0.17°$ which means that 1 microstep per measurement is required, i.e., the same as for the normal scan.

Figure 6A:
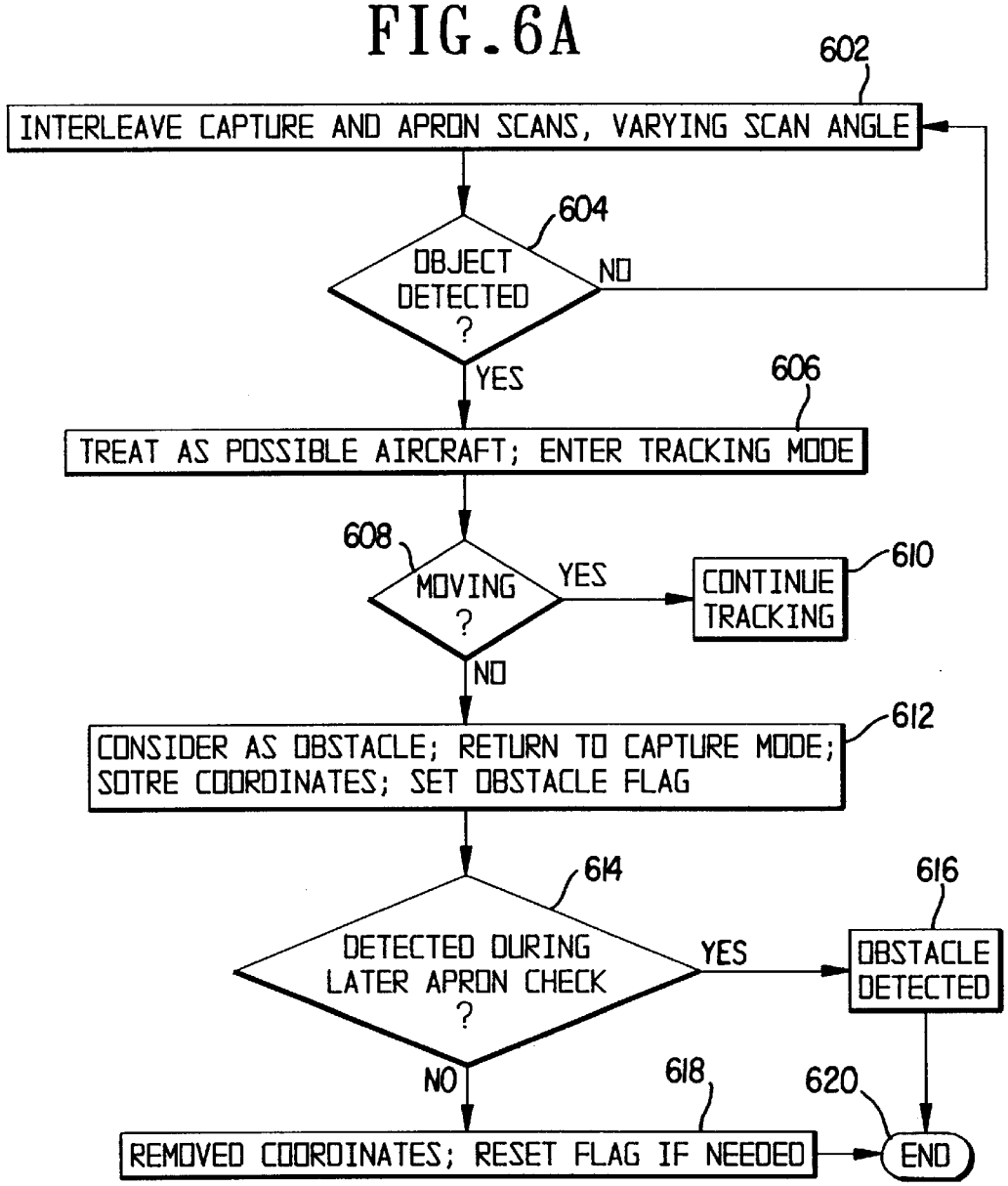

Apron checking can be performed during capture mode, tracking mode or both. Apron checking during capture mode will be described first with reference to FIG. 6A. Then, apron checking during tracking mode will be described with reference to FIG. 6B.

During the capture mode, in step 602, the normal capture scans (±5°) are interleaved (every second scan) with apron check scans from −15° to −5°. The vertical angle γ of the apron check scan is changed between each scan according to Table 1 or 2 above in order to cover the −15° to −5° sector.

If an object is detected in step 604, it is treated in step 606 as a possible aircraft, and the tracking mode is entered to check whether the object is moving (calculated speed above a certain value) in step 608. If it is moving, tracking continues in step 610. If it is not moving, it is considered in step 612 to be an obstacle; the system returns to capture mode, stores the representative coordinates of the obstacle and sets an "Obstacle Flag" indicating that there is an obstacle on the apron. If the obstacle is detected during a later apron check in step 614, the object is considered to be detected in step 616; otherwise, the coordinates are removed in step 618. If there is no stored obstacle coordinates, the flag is reset. The apron check ends in step 620.

During capture mode, one apron check sweep is performed for every three capture sweeps. The apron check sweeps cycle through the apron area from capture point to the stop position, but never closer than 30 m from the system, scanning to the side of the centerline (−15 to −5 degrees). If an object is detected, the docking procedure is paused with a gate-blocked condition. If the object disappears, the docking procedure will resume. To be considered as a blocking object, the object must remain in position over at least 2 checks, indicating that a non-moving object is present in the apron area.

The apron check during capture uses a fixed set of checkpoints, selected to cover the designated apron check area. When an object is detected in the apron check area, the system will halt the capture process and display a warning message. At that time, the system will cycle through the apron check points only, increasing the speed of apron check. This will continue until all apron check points report the area clear, at which time the system will revert to capture mode.

For the apron area to be considered free, at least 1.5 cycles through the apron check points must report no object, in order to keep up with a moving object in the apron check area.

During the tracking mode, as soon as possible after the aircraft ID is verified in step 623, an apron check scan is done in step 634 and is repeated about every 2 seconds (e.g., after every 8 scans). The vertical angle of the apron check scan is chosen such that the scan covers the area from 5 m behind the aircraft nose and inwards. If a non-moving object is detected in step 636, then in step 638, the "Obstacle Flag" is set, and tracking mode continues. If it is determined in step 640 that the object disappears, the flag is reset in step 642. As long as the flag is set during tracking mode, the message WAIT-APRN BLKD is displayed in step 644. The process ends with step 646.

During the tracking mode, one apron check sweep is performed for every 8 nose sweeps (4Hor+4Ver). The apron check sweep is synchronized not to coincide with the engine-id sweeps, as that would result in too much time spent not tracing the aircraft. Engine-id sweeps also have a periodicity of 8 nose sweeps. For an unsuccessfully identified aircraft, the sweep sequence would be: Ver Hor Ver Hor MotorId Ver Hor Ver Hor ApronCheck . . . repeated until id fail at 12 m from stop.

The apron check sweep looks at a fixed position relative to the aircraft nose. If an object is found, the docking procedure is paused with an apron-blocked condition. If the object disappears, the docking procedure will resume.

When an object has been found in front of the aircraft, the system will lock the apron check sweep to the object, regardless of the position of the aircraft, in order not to allow the apron check sweep to slide off the object as the aircraft continues to move forward. The system must still keep track of the nose of the aircraft, but not give any lead-in information. If the aircraft is found to be at the stop position while an apron-blocked condition exists, the system ignores the apron-blocked condition and displays the STOP message.

The apron check will not continue once the aircraft is closer than 4 m to the stop position or the aircraft is closer than 30 m from the system, in order not to interfere with stop position accuracy.

The fog detection embodiment will now be described. First, an overview will be given with reference to the drawings of FIGS. 7A–7I and the flow chart of FIG. 8.

In step 802, the aircraft docking system is started in accordance with the normal procedure. The normal display of FIG. 7A is shown. The stand area, shown in a top-down view in FIG. 7B, is covered in fog.

The echo picture of the fog appears in FIG. 7C. In step 804, the system considers the fog to be an object large enough to generate a capture.

In step 806, the system analyzes the data of FIG. 7C and determines that the captured object is most likely fog or snow. The system remains in the capture mode, but activates the low-visibility display, in which the display of FIG. 7D alternates with that of FIG. 7E.

In step 808, the aircraft approaches the stand. A top-down view of the approach is shown in FIG. 7F.

Figure 7I:
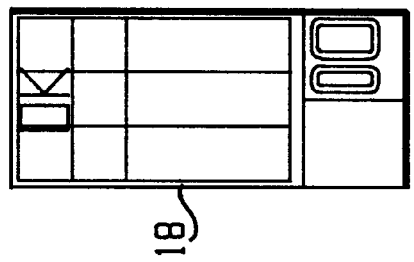

In step 810, as the aircraft approaches the stand, the system sees the aircraft through the fog. The echo picture is shown in FIG. 7G.

Figure 7H:
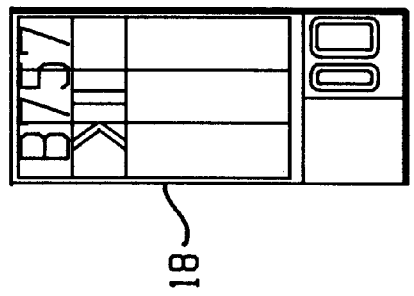
Figure 7G:
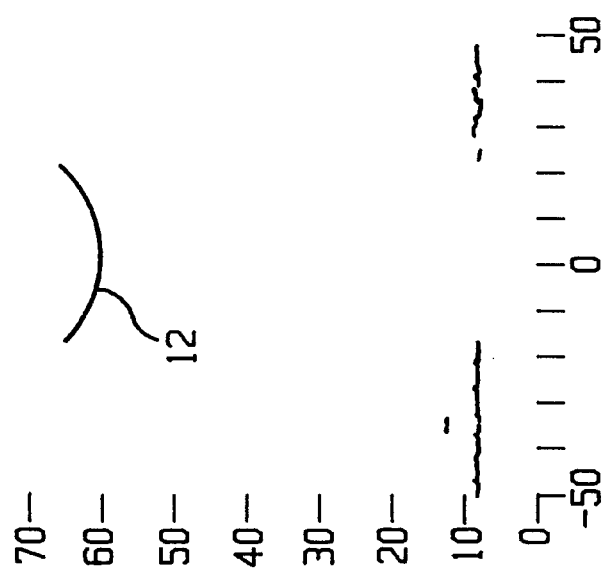

In step 812, as the system catches the aircraft, the distance and azimuth display of FIG. 7H is activated.

In step 814, the docking proceeds in accordance with normal operation, and the display of FIG. 7I is shown. The procedure ends in step 816.

Three algorithms for fog detection will now be presented. Each of the algorithms discriminates an echo picture resulting from fog from an echo picture resulting from solid objects. The algorithms are based on the fact that the spatial distribution of echoes from fog is to a certain extent random. Any of the algorithms can be used during capture mode to avoid a "Gate blocked" or "ID fail" message caused by echoes from fog. Specific numerical ratios used in the algorithms, such as 50% or 60% of all echoes, are determined empirically.

Figure 9:
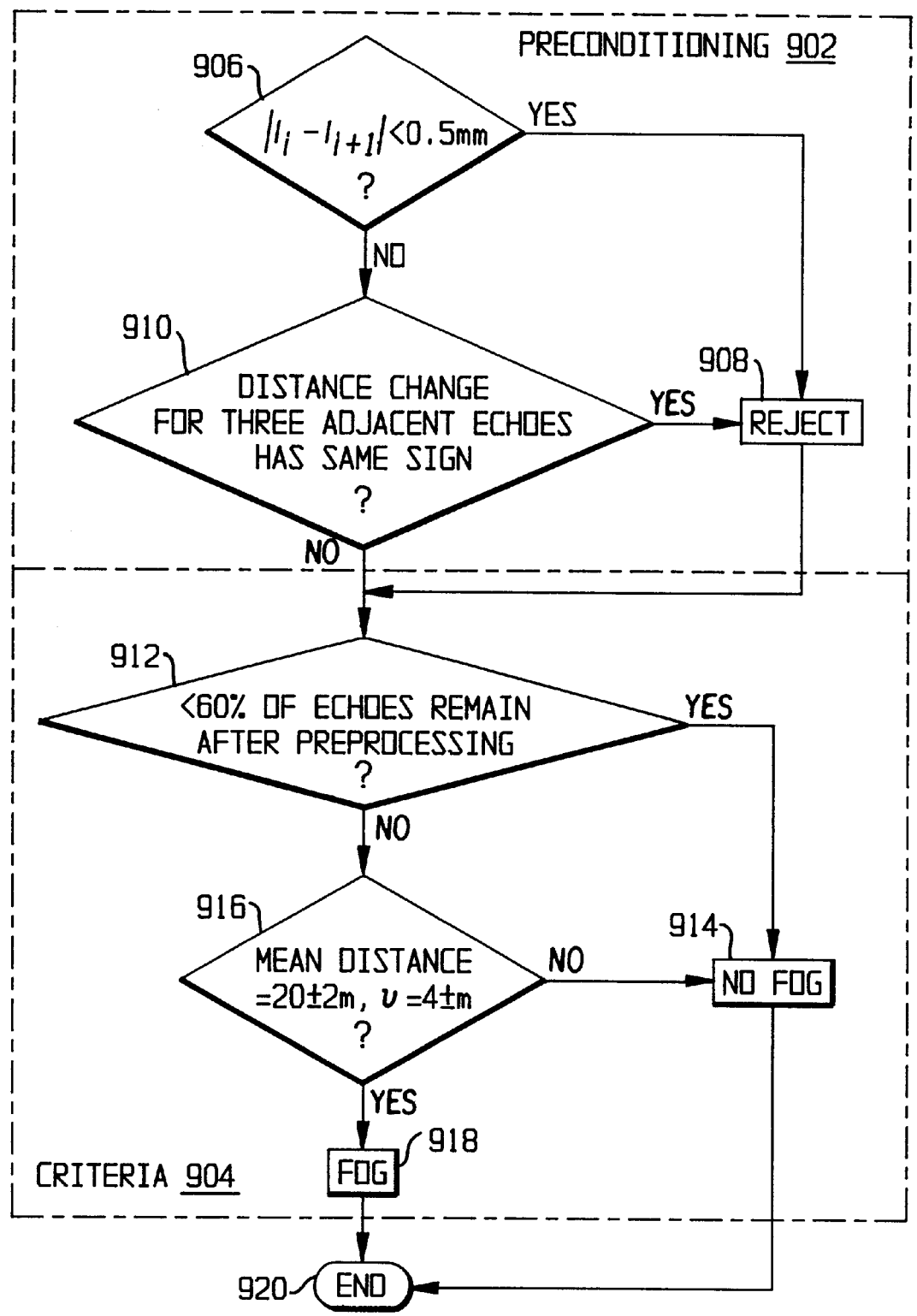
FIGS. 9–11 are diagrams showing flow charts of three alternative algorithms used by the present invention for fog detection.

The first algorithm will be explained with reference to the flow chart of FIG. 9. The first algorithm includes a preconditioning phase 902 for preconditioning the echo pattern and a criteria phase 904 in which the preconditioned echo pattern is compared to criteria to determine whether the pattern results from fog or a solid object.

The preconditioning phase 902 includes two assessments of the spatial distribution of the echoes. There are n echoes having distances $l_i$, i=1 to n, from the laser range finder. If it is determined in step 906 that the distance between two adjacent echoes $|(l_i-l_{i+1})|<0.5$ m, then both echoes are rejected in step 908. If it is determined in step 910 that the distance change for three adjacent echoes in a row has the same sign, the three echoes are rejected in step 908.

The criteria phase 904 applies two criteria to the preconditioned data. If it is determined in step 912 that fewer than 60% of all echoes remain after the preprocessing (that is, that more than 40% are rejected in step 908), than it is determined in step 914 that there is no fog. Otherwise, it is determined in step 916 whether the mean distance $l_{mean}=20\pm 2$ m and v=4±1 m, where $$l_{mean}=\Sigma l_i/n$$

and $$v=[(n\times\Sigma l_i^2)-(\Sigma l_i)^2]/[n\times(n-1)].$$

If so, it is determined in step 918 that there is fog. Otherwise, it is determined in step 914 that there is no fog. The algorithm ends in step 920.

Figure 10:
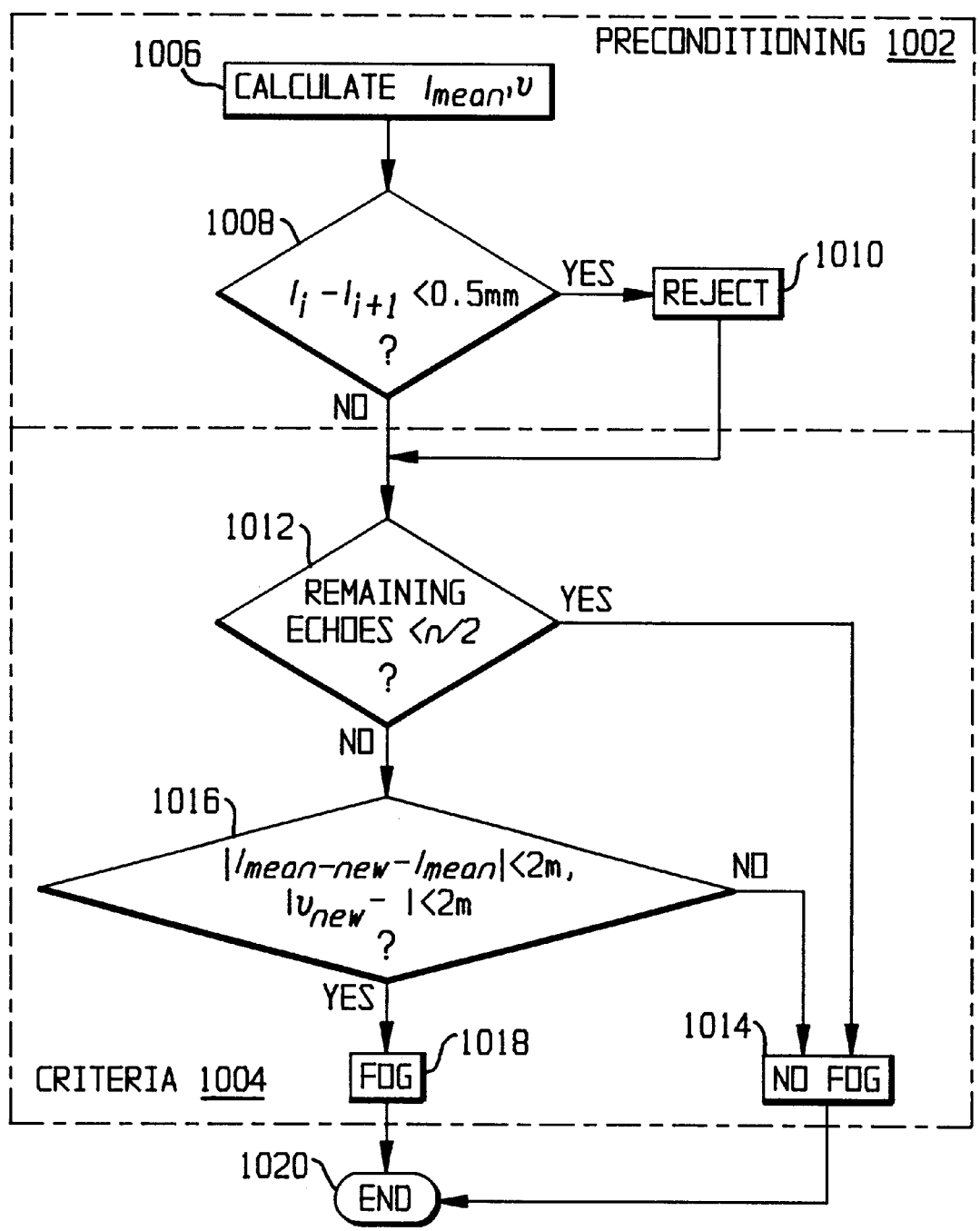

The second algorithm will be explained with reference to FIG. 10. The second algorithm is similar to the first algorithm and also has a preconditioning phase 1002 and a criteria phase 1004.

The preconditioning phase 1002 begins with step 1006, in which $l_{mean}$ and v are calculated for all of the echo data in accordance with the equations given above. For each echo i, the distances to adjacent echoes are assessed in step 1008. If $|l_i-l_{i-1}|<0.5$ m or $|l_i-l_{i+1}|<0.5$ m, then echo i is rejected in step 1010.

The criteria phase 1004 applies two criteria to the preconditioned data. If it is determined in step 1012 that the remaining number of echoes is less than n/2, or in other words, more than half of the echoes were rejected in step 1010, then it is determined in step 1014 that there is no fog. Otherwise, in step 1016, $l_{mean}$ and v are recalculated for the remaining echoes to give $l_{mean-new}$ and $v_{new}$. If $|l_{mean-new}-l_{mean}|<2$ m and $|v_{new}-v|<2$ m, it is determined in step 1018 that there is fog. Otherwise, it is determined in step 1014 that there is no fog. The algorithm ends in step 1020.

Figure 11:
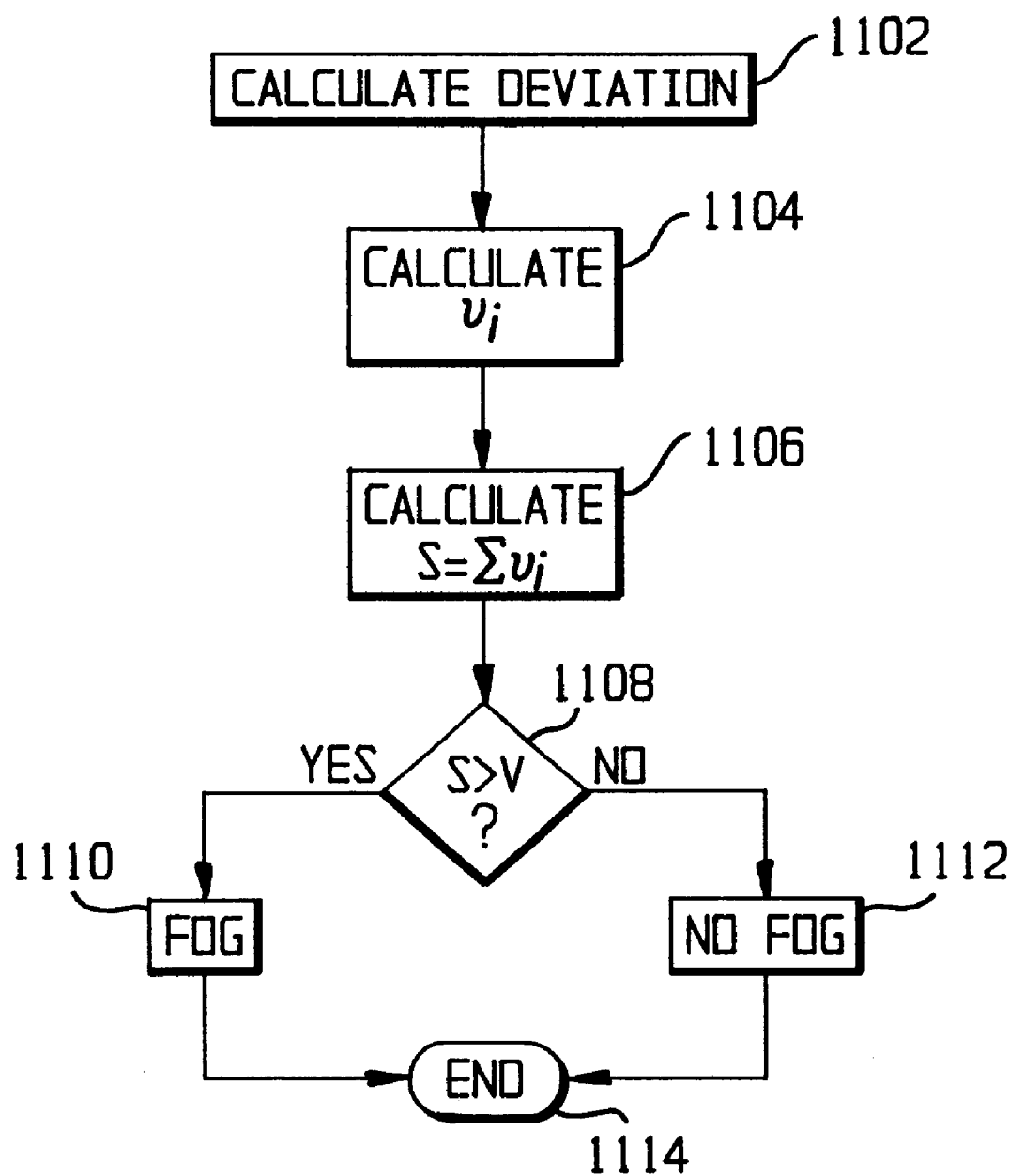

The third algorithm will be explained with reference to FIG. 11. The third algorithm is based on two assumptions. First, it is assumed to be a characteristic of fog that little or no correlation exists between the positions of adjacent echoes. Second, it is assumed to be a characteristic for solid objects that most groups of three or four adjacent echoes are positioned such that an approximately straight line can connect them. In the third algorithm, a preconditioning step is not required, and all echo values are used.

In step 1102, for each echo i, a deviation $u_i$ is calculated from a straight line, extrapolated from the two echoes to the left, as follows:

$$u_i=|l_i-2l_{i-1}+l_{i-2}|.$$

In step 1104, the variable $v_i$ is calculated as follows:

$v_i=1$ if $u_i \geq U$, where $U$=empirically decided, e.g.=1;

$v_i=0$ if $u_i<U$.

In step 1106, the following is calculated:

$S=\Sigma v_i$.

In step 1108, it is determined whether S>V, where V is an empirically determined value, e.g., V=50. If so, it is determined in step 1110 that there is fog. Otherwise, it is determined in step 1112 that there is no fog. The algorithm ends in step 1114.

Each laser sweep which triggers the standard capture conditions is analyzed for possible fog conditions before control is passed to the tracking algorithm. During fog analysis, only echoes from ±8 m of the distance to the caught object and no closer than 2 m and no farther away than 35 m from the laser are considered. For the valid echoes from the object, a count of direction changes is made, where a direction change is defined as an echo 2 dm or more away from its neighbour, and with a different heading (inwards/outwards) from that of the previous distance step. The two first direction changes are not counted, as they are expected to be found on a real aircraft; only the changes beyond the first two are counted. If the ratio of valid echoes from the object to the number of direction changes is lower than 8 (echoes per change), the echo pattern is considered to be caused by fog or snow. If fog or snow is detected, the capture phase continues. If more than 4 of the last 8 capture sweeps report a fog condition, a 'low visibility' condition is considered to exist, and the display switches to 'low visibility' message.

While various preferred embodiments of the present invention have been set forth above, those skilled in the art who have reviewed the present disclosure will readily appreciate that other embodiments can be realized within the scope of the invention. For example, numerical values are illustrative rather than limiting. In particular, empirically determined values can be varied as different conditions at different airports warrant. Also, the techniques disclosed above can be adapted to hardware other than that disclosed. Moreover, techniques disclosed for detecting fog can be used for any form of condensation or precipitation (snow, rain, sleet, etc.). Therefore, the present invention should be construed as limited only by the appended claims.

I claim:

1. A method for identifying a detected object and determining whether an obstacle is present in an area near the object, the method comprising:

(a) projecting a first set of light pulses onto the object and a second set of light pulses into the area to generate reflected pulses;

(b) receiving the reflected pulses in a detector;

(c) identifying the object based on the reflected pulses from the first set of light pulses; and (d) determining whether the obstacle is present in the area based on the reflected pulses from the second set of light pulses.

2. The method of claim 1, wherein, during step (a), the first and second sets of light pulses are projected in alternation.

3. The method of claim 1, wherein:

the second set of light pulses is projected into the area a plurality of times to produce at least first and second sets of reflected pulses from the area; and if the obstacle is detected in the first set of reflected pulses, the second set of reflected pulses is used to determine whether the obstacle is moving.

4. The method of claim 3, wherein, if the obstacle is determined not to be moving, the second set of light pulses is projected into the area again to produce at least a third set of reflected pulses, and step (d) comprises determining from the third set of reflected pulses whether the obstacle is still present.

5. The method of claim 1, wherein the second set of light pulses comprises light pulses directed at a plurality of vertical angles.

6. The method of claim 1, wherein, during step (d), the reflected pulses reflected from below a certain level above ground are ignored.

7. The method of claim 1, further comprising, after the object is identified:

(e) tracking the object as the object moves toward a gate; and continuing steps (a), (b) and (d) during step (e) to detect the obstacle as the object moves toward the gate.

8. The method of claim 1, wherein:

the object is an aircraft; and the area is in an apron of the aircraft.

9. The method of claim 8, wherein the obstacle to be detected is an obstacle which would cause damage to the aircraft if the aircraft collided with the obstacle.

10. The method of claim 9, wherein the obstacle to be detected is a ground service vehicle for servicing the aircraft.

11. A method for detecting an object in an area in which condensation or precipitation may be present, the method comprising:

(a) projecting light pulses into the area to generate reflected pulses;

(b) receiving the reflected pulses in a detector;

(c) determining whether the reflected pulses result from the condensation or precipitation; and (d) if it is determined in step (c) that the reflected pulses do not result from the condensation or precipitation, detecting the object based on the reflected pulses.

12. The method of claim 11, wherein, if it is determined in step (c) that the reflected pulses result from the condensation or precipitation, steps (a) and (b) are continued until the object is detected through the condensation or precipitation.

13. The method of claim 12, wherein:

the object is an aircraft;

the method is implemented in an aircraft docking system which comprises an aircraft docking display; and if it is determined in step (c) that the reflected pulses result from the condensation or precipitation, the aircraft docking display is controlled to indicate downgraded performance of the aircraft docking system to a pilot of the aircraft.

14. The method of claim 11, wherein step (c) comprises:

(i) calculating a quantity representing a spatial distribution of the reflected pulses; and (ii) using the quantity calculated in step (c)(i) to determine whether the reflected pulses result from the condensation or precipitation.

15. The method of claim 14, wherein the quantity is a measure of randomness of spatial positions of the reflected pulses.

16. The method of claim 15, wherein step (c)(i) comprises:

(A) calculating a difference between distance values for adjacent ones of the reflected pulses;

(B) rejecting those reflected pulses for which the difference calculated in step (c)(i)(A) is lower than a threshold;

(C) rejecting any three adjacent ones of the reflected pulses which have a distance change with a same sign; and (D) calculating a quotient of a number of the reflected pulses remaining after steps (c)(i)(A) through (c)(i)(C) to a total number of the reflected pulses.

17. A system for identifying a detected object and determining whether an obstacle is present in an area near the object, the system comprising:

a light source for projecting a first set of light pulses onto the object and a second set of light pulses into the area to generate reflected pulses;

a detector for receiving the reflected pulses; and a computing device for identifying the object based on the reflected pulses from the first set of light pulses and for determining whether the obstacle is present in the area based on the reflected pulses from the second set of light pulses.

18. The system of claim 17, wherein the light source projects the first and second sets of light pulses in alternation.

19. The system of claim 17, wherein:

the second set of light pulses is projected into the area a plurality of times to produce at least first and second sets of reflected pulses from the area; and if the obstacle is detected in the first set of reflected pulses, the second set of reflected pulses is used to determine whether the obstacle is moving.

20. The system of claim 19, wherein, if the obstacle is determined not to be moving, the second set of light pulses is projected into the area again to produce at least a third set of reflected pulses, and the computing device determines from the third set of reflected pulses whether the obstacle is still present.

21. The system of claim 17, wherein the second set of light pulses comprises light pulses directed by the light source at a plurality of vertical angles.

22. The system of claim 17, wherein the computing device ignores the reflected pulses reflected from below a certain level above ground in determining whether the obstacle is present.

23. The system of claim 17, wherein, after the object is identified, the computing device tracks the object as the object moves toward a gate, and the light source, detector and computing device operate while the object moves toward the gate to detect the obstacle as the object moves toward the gate.

24. A system for detecting an object in an area in which condensation or precipitation may be present, the system comprising:

a light source for projecting light pulses into the area to generate reflected pulses;

a detector for receiving the reflected pulses; and a computing device for determining whether the reflected pulses result from the condensation or precipitation and, if the reflected pulses do not result from the condensation or precipitation, detecting the object based on the reflected pulses.

25. The system of claim 24, wherein, if the computing device determines that the reflected pulses result from the condensation or precipitation, the light source and detector continue to operate until the object is detected through the condensation or precipitation.

26. The system of claim 25, wherein:

the system is implemented in an aircraft docking system which comprises an aircraft docking display; and if the computing device determines that the reflected pulses result from the condensation or precipitation, the computing device controls the aircraft docking display to indicate downgraded performance of the aircraft docking system.

27. The system of claim 24, wherein the computing device determines whether the reflected pulses result from the condensation or precipitation by:

(i) calculating a quantity representing a spatial distribution of the reflected pulses; and (ii) using the quantity to determine whether the reflected pulses result from the condensation or precipitation.

28. The system of claim 27, wherein the quantity is a measure of randomness of spatial positions of the reflected pulses.

29. The system of claim 28, wherein the computing device calculates the quantity by:

(A) calculating a difference between distance values for adjacent ones of the reflected pulses;

(B) rejecting those reflected pulses for which the difference calculated in step (A) is lower than a threshold;

(C) rejecting any three adjacent ones of the reflected pulses which have a distance change with a same sign; and (D) calculating a quotient of a number of the reflected pulses remaining after steps (A) through (C) to a total number of the reflected pulses.

\* \* \* \* \*